US006751398B2

(12) United States Patent
Agnihotri et al.

(10) Patent No.: US 6,751,398 B2
(45) Date of Patent: Jun. 15, 2004

(54) SYSTEM AND METHOD FOR DETERMINING WHETHER A VIDEO PROGRAM HAS BEEN PREVIOUSLY RECORDED

(75) Inventors: Lalitha Agnihotri, Fishkill, NY (US); Thomas Francis McGee, III, Garrison, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 616 days.

(21) Appl. No.: 09/745,915

(22) Filed: Dec. 22, 2000

(65) Prior Publication Data

US 2002/0081090 A1 Jun. 27, 2002

(51) Int. Cl.[7] .................................................. H04N 5/91
(52) U.S. Cl. ............................................ 386/46; 386/83
(58) Field of Search ............................. 386/46, 83, 95, 386/94; 707/104.1; 348/465, 473, 474; 358/908

(56) References Cited

U.S. PATENT DOCUMENTS

| 4,857,999 | A | * | 8/1989 | Welsh ........................... 725/22 |
| 4,931,865 | A | | 6/1990 | Scarampi ...................... 358/84 |
| 5,485,518 | A | | 1/1996 | Hunter et al. .................. 380/20 |
| 5,526,130 | A | * | 6/1996 | Kim ............................ 386/83 |
| 5,870,151 | A | | 2/1999 | Korber ......................... 348/553 |
| 5,995,155 | A | | 11/1999 | Schindler et al. ............ 348/461 |
| 6,005,598 | A | | 12/1999 | Jeong .......................... 348/5.5 |
| 6,185,360 | B1 | * | 2/2001 | Inoue et al. ................... 386/46 |
| 6,469,749 | B1 | * | 10/2002 | Dimitrova et al. ........... 348/722 |
| 6,601,074 | B1 | * | 7/2003 | Liebenow .................... 707/104.1 |

FOREIGN PATENT DOCUMENTS

| EP | 692790 | 1/1996 | ........... G11B/27/30 |
| EP | 439290 | 10/1996 | ........... G11B/27/19 |
| WO | WO 9941684 | 9/1999 | ........... G06F/17/30 |

* cited by examiner

*Primary Examiner*—Huy Nguyen

(57) ABSTRACT

For use in a video recorder, there is disclosed a system and method for determining whether an incoming video program has been previously recorded by the video recorder. The system comprises a transcript processor that is capable of obtaining a transcript of the incoming video program from a number of different sources of text. The transcript processor is capable of assembling the transcript from closed caption text of the video program. The transcript processor compares the transcript of the incoming video program with transcripts of video programs that have been previously recorded by the video recorder in order to determine whether the incoming video program has been previously recorded by the video recorder. The incoming video program is not recorded a second time if it has been previously recorded.

4 Claims, 4 Drawing Sheets

SYSTEM AND METHOD FOR DETERMINING WHETHER A VIDEO PROGRAM HAS BEEN PREVIOUSLY RECORDED

TECHNICAL FIELD OF THE INVENTION

The present invention is directed, in general, to the recording of a video program in a video recorder and, more specifically, to a system and method for determining whether a video program has been previously recorded by a video recorder.

BACKGROUND OF THE INVENTION

A wide variety of video recorders are available in the marketplace. Most people own, or are familiar with, a video cassette recorder (VCR). A video cassette recorder records video programs on magnetic cassette tapes. More recently, video recorders that use computer magnetic hard disks rather than magnetic cassette tapes to store video programs have appeared in the market. For example, the ReplayTV™ recorder and the TiVO™ recorder digitally record television programs on hard disk drives using, for example, an MPEG video compression standard. Additionally, some video recorders may record on a readable/writable, digital versatile disk (DVD) rather than a magnetic disk.

Video recorders are typically used in conjunction with a video display device such as a television. A video recorder may be used to record a video program at the same time that the video program is being displayed on the video display device. A common example is the use of a video cassette recorder (VCR) to record television programs while the television programs are simultaneously displayed on a television screen.

A video recorder may also be used to record a video program even though the video program is not being displayed on the video display device. A common example is the use of a video cassette recorder (VCR) to automatically record television programs while the viewer is not present.

When a viewer wishes to record a video program the viewer gives instructions to (or "programs") the video recorder to record the video program. The viewer gives the video recorder information concerning the date, the time, and the channel information of the desired program. Alternatively, the video recorder automatically selects a video program based upon information from the program profile in the viewer's personal viewing history. When the video recorder determines that a desired program (or an automatically selected program) is being received, the video recorder records the program.

In many instances, however, a video program may be shown more than once. For example, it is not uncommon for a video program to be shown in a particular time slot and then be shown again on the same channel in a different time slot later the same day (or on another day). When a desired video program is shown more than once, the video recorder also records the additional showings of the desired video program. This occurs even though the video recorder has previously recorded an identical version of the desired video program.

Some video recorders (e.g., the TiVO™ recorder) are capable of using Electronics Program Guide (EPG) information to determine the identity of the video programs. Whenever the video recorder detects a second video program that has the same EPG information as a previously recorded first video program, the video recorder will not record the second video program.

This method does not always produce a desired result. EPG information may often be unavailable or inaccurate, especially in the case of live television broadcasts. In addition, it is known that instances have occurred in which the first and second parts of a "pilot" program were assigned the same EPG information. A video recorder using EPG information recorded the first part of the "pilot" program but did not record the second part of the "pilot" program because the two parts had identical EPG information.

There is therefore a need in the art for an improved system and method in a video recorder for identifying a repeated transmission of a video program that has already been recorded. That is, there is a need in the art for an improved system and method in a video recorder for recognizing that a video program that is presently being received is identical to a video program that has already been recorded by the video recorder.

There is also a need in the art for an improved system and method in a video recorder for ceasing to record an additional version of a video program that has already been recorded. There is also a need in the art for an improved system and method in a video recorder for resetting a video recorder to discard any recorded portion of an additional version of a video program that has already been recorded.

SUMMARY OF THE INVENTION

To address the above-discussed deficiencies of the prior art, it is a primary object of the present invention to provide, for use in a video recorder utilizing recording tape, hard disk, solid state memory, or other types of recording devices, a system and method for identifying a repeated transmission of a video program that has already been recorded in a video recorder. In other words, it is a primary object of the present invention to provide a system and method for determining whether a video program has been previously recorded in a video recorder.

The present invention comprises a transcript processor that is capable of obtaining a transcript of an incoming video program by assembling the transcript from closed caption text of the video program, or from text from a speech to text converter, or from text from a third party source, or from extracted video text, or from embedded screen text. The transcript processor compares the transcript of the incoming video program with transcripts of video programs that have been previously recorded by the video recorder in order to determine whether the incoming video program has been previously recorded by the video recorder. The incoming video program is not recorded a second time if it has been previously recorded.

According to an advantageous embodiment of the present invention, the transcript processor is capable of assembling a transcript from a source of text (e.g., from closed caption text) of a video program by executing computer software instructions in a video recorder controller.

According to an advantageous embodiment of the present invention, the video recorder controller is capable of sequentially assembling a transcript of a video program from individual closed caption text portions of a video program.

According to another advantageous embodiment of the present invention, the video recorder controller is capable of excluding the text of commercial messages from the transcript of a video program.

According to yet another embodiment of the present invention, the video recorder controller is capable of comparing a transcript of a video program with transcripts of video programs that have previously been recorded by the video recorder.

According to still another embodiment of the present invention, the transcript processor is capable of stopping the process of recording a video program when the transcript processor determines that a video program has previously been recorded by the video recorder.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video recorder.

Figure 1:
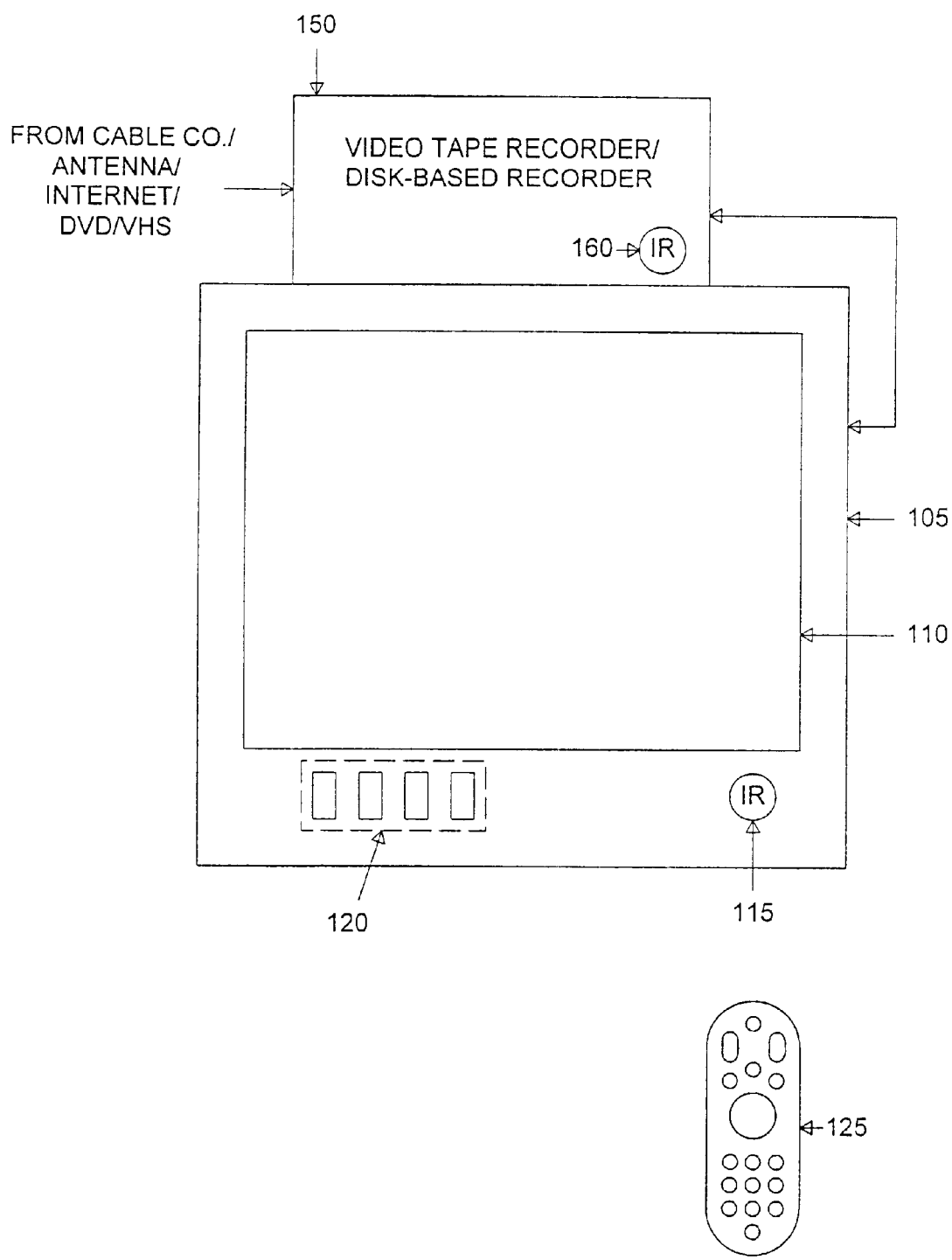
FIG. 1 illustrates an exemplary video recorder and a television set according to an advantageous embodiment of the present invention.

FIG. 1 illustrates exemplary video recorder 150 and television set 105 according to one embodiment of the present invention. Video recorder 150 receives incoming television signals from an external source, such as a cable television service provider (Cable Co.), a local antenna, a satellite, the Internet, or a digital versatile disk (DVD) or a Video Home System (VHS) tape player. Video recorder 150 transmits television signals from a selected channel to television set 105. A channel may be selected manually by the viewer or may be selected automatically by a recording device previously programmed by the viewer. Alternatively, a channel and a video program may be selected automatically by a recording device based upon information from a program profile in the viewer's personal viewing history.

In Record mode, video recorder 150 may demodulate an incoming radio frequency (RF) television signal to produce a baseband video signal that is recorded and stored on a storage medium within or connected to video recorder 150. In Play mode, video recorder 150 reads a stored baseband video signal (i.e., a program) selected by the viewer from the storage medium and transmits it to television set 105.

Video recorder 150 may comprise a video recorder of the type that utilizes recording tape, or that utilizes a hard disk, or that utilize solid state memory, or that utilizes any other type of recording apparatus. If video recorder 150 is a video cassette recorder (VCR), video recorder 150 stores and retrieves the incoming television signals to and from a magnetic cassette tape. If video recorder 150 is a disk drive-based device, such as a ReplayTV™ recorder or a TiVO™ recorder, video recorder 150 stores and retrieves the incoming television signals to and from a computer magnetic hard disk rather than a magnetic cassette tape. In still other embodiments, video recorder 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-RW).

Video recorder 150 comprises infrared (IR) sensor 160 that receives commands (such as Channel Up, Channel Down, Volume Up, Volume Down, Record, Play, Fast Forward (FF), Reverse, and the like) from remote control device 125 operated by the viewer. Television set 105 is a conventional television comprising screen 110, infrared (IR) sensor 115, and one or more manual controls 120 (indicated by a dotted line). IR sensor 115 also receives commands (such as Volume Up, Volume Down, Power On, Power Off) from remote control device 125 operated by the viewer.

It should be noted that video recorder 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. The incoming signal may be a digital signal, an analog signal, Internet protocol (IP) packets, or signals in other types of format.

For the purposes of simplicity and clarity in explaining the principles of the present invention, the descriptions that follow shall generally be directed to an embodiment in which video recorder 150 receives (from a cable service provider) incoming analog television signals that contain closed caption text information. Nonetheless, those skilled in the art will understand that the principles of the present invention may readily be adapted for use with digital television signals, wireless broadcast television signals, local storage systems, an incoming stream of IP packets containing MPEG data, and the like.

In addition, those skilled in the art will understand that the principles of the present invention may readily be adapted for use with other sources of text, including, but not limited to, text from a speech to text converter, text from a third party source, text from extracted video text, text from embedded screen text, and the like. Therefore, the term "transcript" shall be defined to mean a text file originating from any source of text, including, but not limited to, closed caption text, text from a speech to text converter, text from a third party source, text from extracted video text, text from embedded screen text, and the like.

Figure 2:
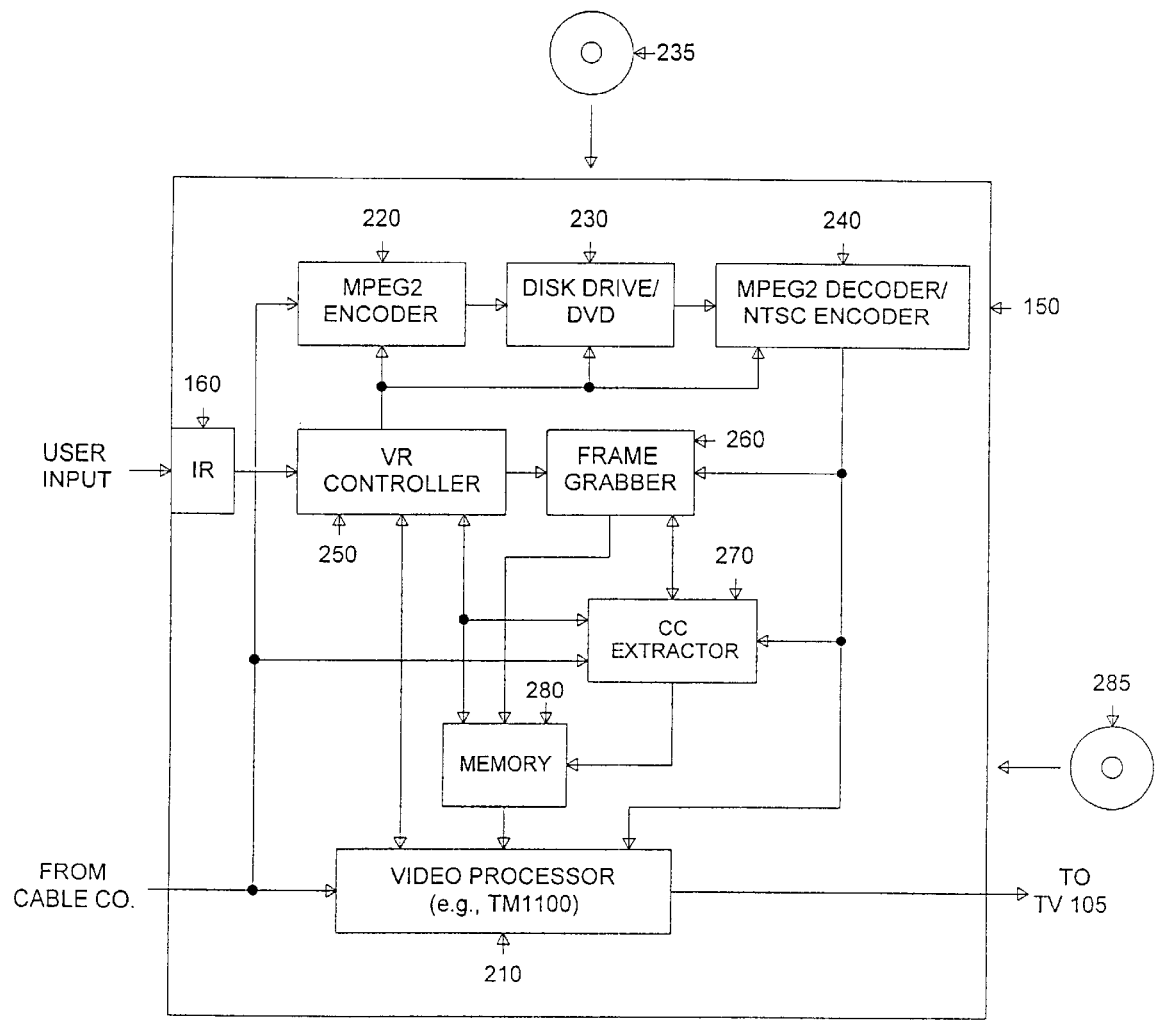
FIG. 2 illustrates a block diagram of the exemplary video recorder according to an advantageous embodiment of the present invention.

FIG. 2 illustrates exemplary video recorder 150 in greater detail according to one embodiment of the present invention. Video recorder 150 comprises IR sensor 160, video processor 210, MPEG2 encoder 220, hard disk drive 230, MPEG2 decoder/NTSC encoder 240, and video recorder (VR) controller 250. Video recorder 150 further comprises frame grabber 260, closed captioned extractor 270, and memory 280. VR controller 250 directs the overall operation of video recorder 150, including View mode, Record mode, Play mode, Fast Forward (FF) mode, Reverse mode, among others.

In View mode, VR controller 250 causes the incoming television signal from the cable service provider to be demodulated and processed by video processor 210 and transmitted to television set 105, without storing video signals in (or retrieving video signals from) hard disk drive 230. Video processor 210, which may be, for example, a TriMedia 1100 (TM1100) media processor, contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 and video frames from memory 280 and transmitting a baseband television signal (e.g., super video signal) to television set 105.

In Record mode, VR controller 250 causes the incoming television signal to be stored on hard disk drive 230. Under the control of VR controller 250, MPEG2 encoder 220 receives an incoming analog television signal from the cable service provider and converts the received RF signal to MPEG format for storage on hard disk drive 230. Note that in the case of a digital television signal, the signal may be stored directly on hard disk drive 230 without being encoded in MPEG2 encoder 220.

In Play mode, VR controller 250 directs hard disk drive 230 to stream the stored television signal (i.e., a program) to MPEG2 decoder/NTSC encoder 240, which converts the MPEG2 data from hard disk drive 230 to, for example, a super video (S-Video) signal that video processor 210 transmits to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD-RW), re-writable CD-ROMs, VCR tapes and the like. In fact, hard disk drive 230 need not be fixed in the conventional sense that it is permanently embedded in video recorder 150. Rather, hard disk drive 230 includes any mass storage device that is dedicated to video recorder 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMS. As illustrated schematically in FIG. 2, removable disk drives of this type are capable of receiving and reading re-writable CD-ROM disk 235.

Furthermore, in an advantageous embodiment of the present invention, hard disk drive 230 may include external mass storage devices that video recorder 150 may access and control via a network connection (e.g., Internet protocol (IP) connection), including, for example, a disk drive in the viewer's home personal computer (PC) or a disk drive on a server at the viewer's Internet service provider (ISP).

VR controller 250 obtains information from video processor 210 concerning video signals that are received by video processor 210. When VR controller 250 determines that video recorder 150 is receiving a video program, VR controller 250 determines if the video program is one that has been selected to be recorded. If the video program is to be recorded, then VR controller 250 causes the video program to be recorded on hard disk drive 230 in the manner previously described. If the video program is not to be recorded, then VR controller 250 causes the video program to be processed by video processor 210 and transmitted to television set 105 in the manner previously described.

As the video program is recorded on hard disk drive 230, VR controller 250 assembles a transcript of the recorded video program from closed caption (CC) text present in the video program. As will be more fully described, VR controller 250 assembles the transcript using frame grabber 260, closed caption (CC) extractor 270, and memory 280.

Memory 280 may comprise random access memory (RAM) or a combination of random access memory (RAM) and read only memory (ROM). Memory 280 may comprise a non-volatile random access memory (RAM), such as a flash memory card. In an alternate advantageous embodiment of video recorder 150, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 2, removable disk drives of this type are capable of receiving and reading re-writable CD-ROM disk 285.

Figure 3:
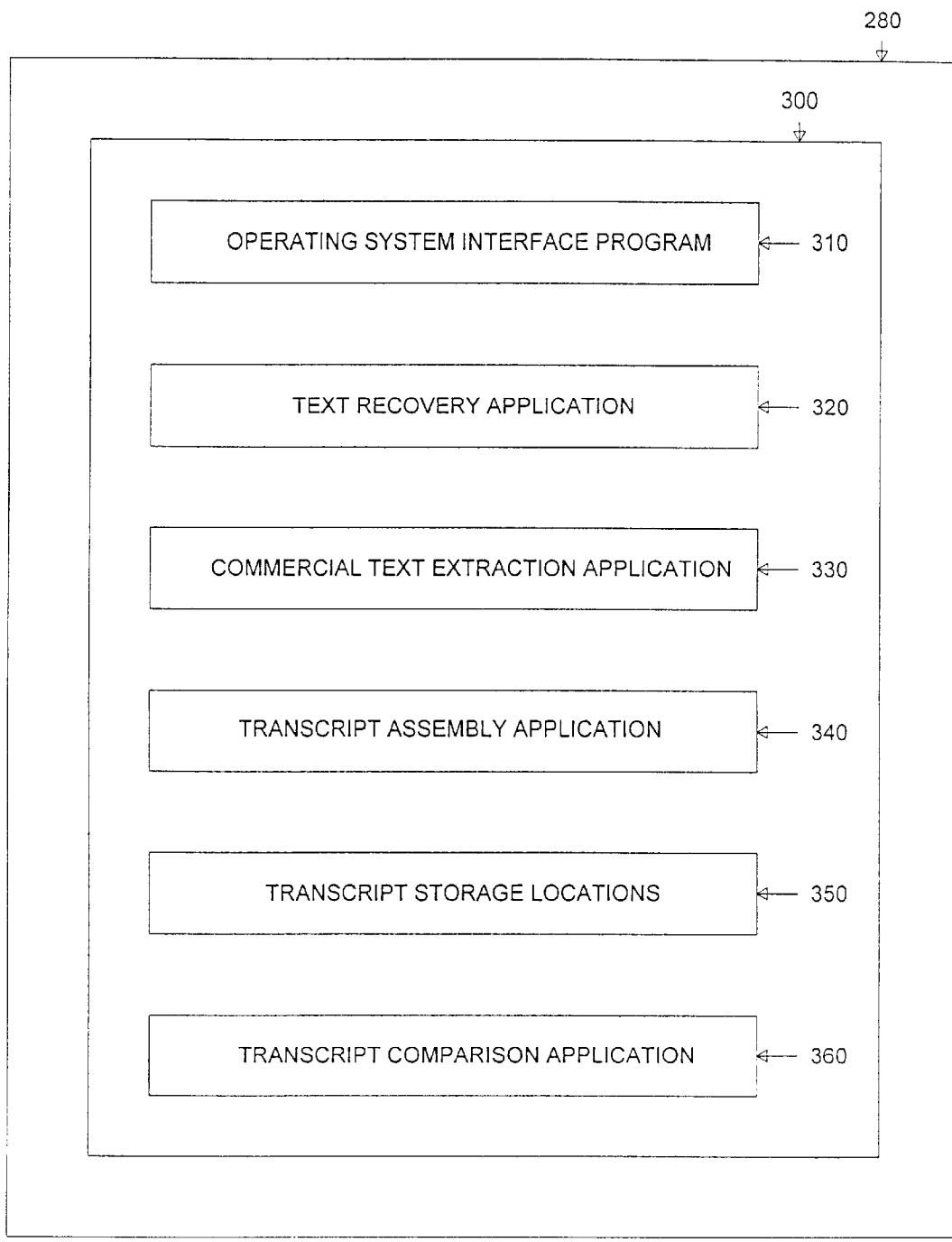
FIG. 3 illustrates computer software that may be used with in the exemplary video recorder according to an advantageous embodiment of the present invention.

An advantageous embodiment of video recorder 150 of the present invention comprises computer software 300 (shown in FIG. 3) capable of assembling transcripts of video programs as the video programs are being recorded and using the transcripts to identify repeated transmissions of video programs that have previously been recorded. FIG. 3 illustrates a selected portion of memory 280 that contains computer software 300 of the present invention. Memory 280 contains operating system interface program 310, text recovery application 320, commercial text extraction application 330, transcript assembly application 340, transcript storage locations 350, and transcript comparison application 360.

VR controller 250 and computer software 300 together comprise a transcript processor that is capable of carrying out the present invention. Under the direction of instructions in computer software 300 stored within memory 280, VR controller 250 assembles transcripts of recorded video programs, stores the transcripts in memory 280 (or in hard disk drive 230), and uses the stored transcripts to identify repeated transmissions of video programs that have previously been recorded.

The stored transcripts are retained in memory 280 (or in hard disk drive 230) until the expiration of a retention time period (e.g., six months, one year, two years). The length of the retention time period may be selected by the user. If the user does not select a length for the retention time period, then VR controller 250 assigns a default retention time period (e.g., one year). Operating system interface program 310 coordinates the operation of computer software 300 with the operating system of VR controller 250.

To assemble a transcript, VR controller 250 directs hard disk drive 230 to stream the stored video signals to MPEG2 decoder/NTSC encoder 240, which converts the MPEG2 data to a video signal in the manner previously described. Under the direction of VR controller 250, frame grabber 260 is capable of capturing video frames from the output of MPEG2 decoder/NTSC encoder 240 and sending the captured video frames to text recovery application 320 in memory 280. In an alternative advantageous embodiment, VR controller 250 may assemble a transcript at the same time that the video signals are being recorded on hard disk drive 230.

Under the direction of VR controller 250, CC extractor 270 detects CC text in the NTSC input signal to MPEG2 encoder 220. CC text is typically inserted in the blanking interval at the end of line 21 (or line 22) of the analog video signal. CC extractor 270 uses a time stamp associated with each line of CC data to identify a selected key frame of video corresponding to the CC text. CC extractor 270 sends each line of CC text and the time stamp to text recovery application 320 in memory 280. Alternatively, CC extractor 270 can send each word of CC text (and a corresponding time stamp) to text recovery application 320 in memory 280.

When assembling a transcript of a video program, it is clear that CC text from commercial advertisements ("commercials") should not be included in the transcript. A second transmission of the video program will very likely have different commercials than the first transmission. In order to assemble a transcript of the first transmission of the video program that may be compared with a second transmission of the video program, it is best to exclude the commercial CC text. This function is accomplished by commercial text extraction application 330. The excluded commercial CC text may be stored in a separate file for later use, if needed.

Text recovery application 320 receives CC text from CC extractor 270 and sends the CC text to transcript assembly application 340 where the CC text is sequentially assembled into a transcript. As text recovery application 320 receives CC text, it continually monitors the CC text looking for CC text of a commercial. When text recovery application 320 finds CC text of a commercial, it causes commercial text extraction application 330 to extract the CC text of the commercial. This may be accomplished by not selecting the CC text of the commercial to be included in the transcript. Transcript assembly application 340 only receives CC text from which CC text from commercials has been excluded.

Commercials may be located using a number of different methods, including, for example, the method described in U.S. Pat. No. 6,100,941 issued Aug. 8, 2000 to Dimitrova et al. entitled "Apparatus and Method for Locating a Commercial Disposed Within a Video Data Stream" and the method described in U.S. patent application Ser. No. 09/417,288 filed Oct. 13, 1999 by Dimitrova et al. entitled "Automatic Signature Base Spotting, Learning and Extracting of Commercials and Other Video Content."

In an alternative advantageous embodiment of the present invention, it is possible to retain the commercials in the transcript while adding an identifying marker at the beginning and end of each commercial. Each such set of two identifying markers serves to indicate that the commercial text enclosed between the two identifying markers is not to be considered during the process of matching the transcript containing the commercial text with other transcripts.

In addition to receiving CC text from CC extractor 270, text recovery application 320 is also capable of receiving text from a number of different sources of text. Text recovery application 320 is capable of monitoring text from each type of text source in the same manner as the CC text from CC extractor 270.

When the video program ends, VR controller 250 causes video recorder 250 to stop recording the video program on hard disk drive 230. Transcript assembly application 340 completes the transcript of the newly recorded video program. VR controller 250 then adds the new transcript to a transcript database by storing the new transcript in one of a plurality of transcript storage locations 350 in memory 280. When all of the transcript storage locations 350 have been used to store transcripts, VR controller 250 may send additional transcripts to hard disk drive 230 for storage.

It is possible to obtain transcripts of video programs using other methods. For example, an electronic copy of a transcript of a video program may be available from an external source such as a web site. An electronic copy of a transcript from a web site may be downloaded directly into hard disk drive 230 of video recorder 150. Because transcripts from external sources are usually already properly formatted, it usually is not necessary to apply text recovery application 320 and transcript assembly application 340 to such transcripts. Although the present invention has described an advantageous method of obtaining transcripts of video programs, the present invention is not limited to using only one method of obtaining transcripts of video programs.

VR controller 250 is capable of using the transcript database to determine if a video program that is being recorded is a repeated transmission of a video program that has already been recorded. For example, assume that VR controller 250 has been recording a video program for a period of time (e.g., fifteen minutes), and that transcript assembly application 340 of computer software 300 has assembled a fifteen minute portion of the transcript of the video program. VR controller 250 then accesses transcript comparison application 360 of computer software 300 to compare the text of the fifteen minute portion of the transcript to the texts of the transcripts that are already stored in the transcript database.

Transcript comparison application 360 may comprise an approximate string matching algorithm. One such algorithm known as a "Shift-Or Algorithm" is described in pages 186–192 of The Computer Science and Engineering Handbook edited by Allen B. Tucker (CRC Press, Massachusetts, 1997). The "Shift-Or Algorithm" is capable of handling spurious characters that may be introduced due to the inaccurate exclusion of transcripts of commercials. Such errors can arise 1) when a program segment is erroneously considered to be part of a commercial and, therefore, a portion of the program segment is excluded from the transcript, or 2) when a commercial segment is erroneously considered to be part of the program and, therefore, a portion of the commercial is included in the transcript.

There may also be instances in which two slightly different transcripts of the same program exist, each having been generated by a different company. To overcome this difficultly, the "Shift-Or Algorithm" can be used to consider only the root form of "non-stop" words. "Stop" words are short common words such as "this", "in", "or", etc. "Non-stop" words are the more meaningful words in a sentence that are useful for string matching.

The comparison parameter that defines a "match" may be predefined (e.g., as a default setting in VR controller 250) or may be preselected by the viewer. For example, the viewer may choose a comparison parameter that considers the texts to "match" if the texts are identical for thirty percent (30%) of the length of the video program.

The "Shift-Or Algorithm" is capable of matching text with "K" differences. The value of "K" may be set, for example, to be twenty percent (20%) of the characters that are being matched for the current transcript. If there are one hundred (100) characters in the transcripts, then if up to twenty (20) of these characters in the current transcript are different from those in the previous transcript, then the two transcripts are said to match.

Further, the previous transcript is considered to match the current transcript if the "Shift-Or Algorithm" results in a match with twenty percent (20%) differences (or less) within the thirty percent (30%) of the program transcripts that are compared. This means that the two transcripts are eighty percent (80%) or more similar. This threshold could be changed depending upon the source of the text of the transcripts. The value of "K" could be set to be twenty percent (20%) if the source of text is closed captioning. The value of "K" could be set to be as high as forty percent (40%) if the source of text is speech to text conversion. This is because current technology for speech to text conversion is prone to create errors in the conversion process.

For efficient matching, care should be taken to match programs having the same name if the name of the program is available from the EPG information. For example, a transcript of an episode of "Star Trek: Voyager" should only be matched with transcripts of the stored episodes of "Star Trek: Voyager." If the name of the program is not available, however, then care should be taken to match programs having the same length. A one hour program should only be matched with transcripts of other one hour programs. This will speed up the matching process by reducing the number of stored transcripts that have to be considered in the matching process.

To return to the example of the fifteen minute transcript, if the fifteen minute portion of the transcript matches a similar portion of a transcript that has previously been stored in the transcript database, then VR controller 250 determines that the video program that is currently being recorded has already been recorded. VR controller 250 then stops hard disk drive 230 from recording any more of the video program and causes hard disk drive 230 to discard what has already been recorded.

If the fifteen minute portion of the transcript does not match a portion of a transcript that has previously been stored in the transcript database, then VR controller 250 determines that the video program that is currently being recorded is being recorded for the first time. The video program is recorded until it ends and the transcript of the video program is added to the transcript database. Video program information (e.g., the name of the program, the duration of the program, any available description of the program) is also added to the transcript database.

Figure 4:
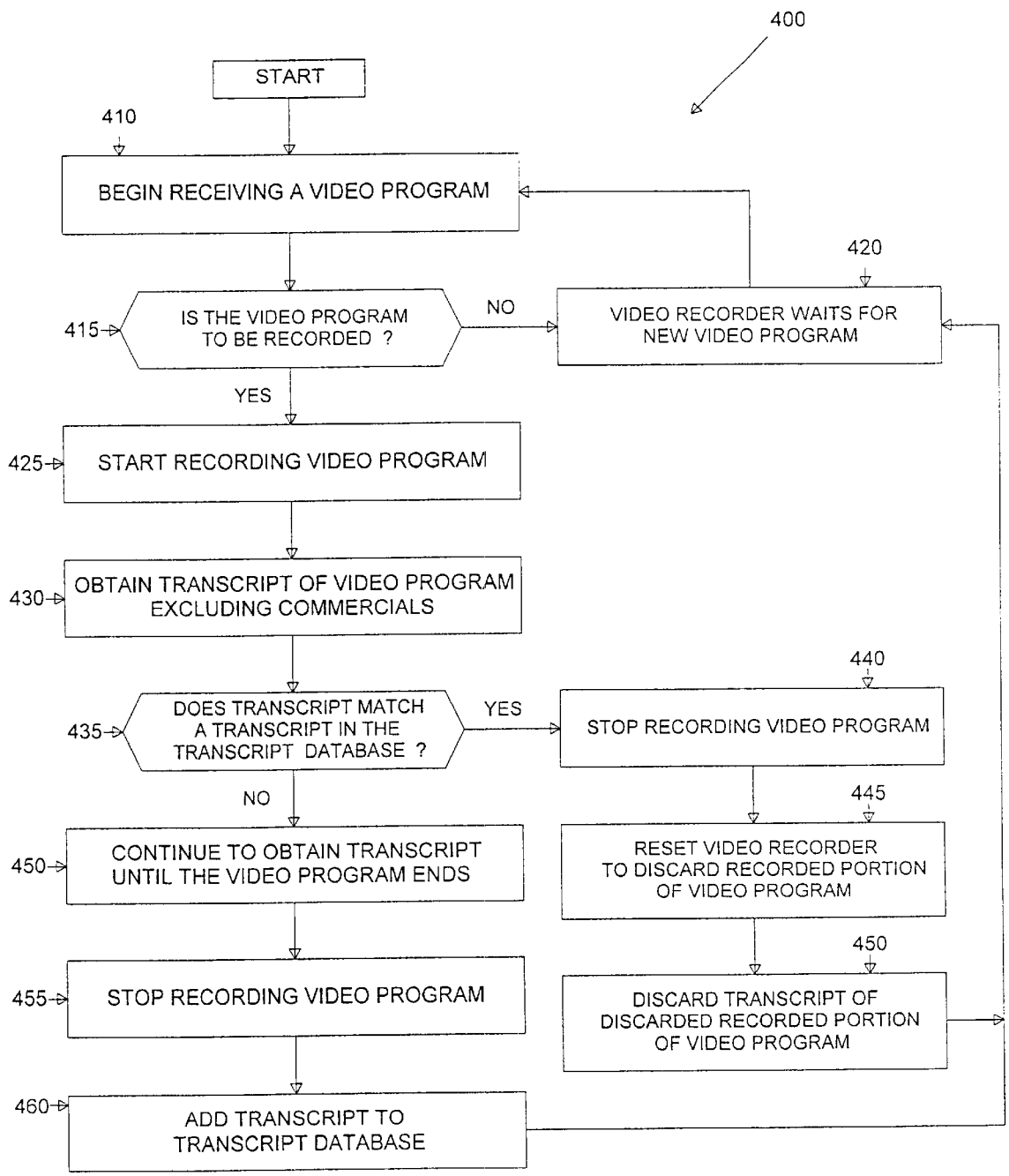
FIG. 4 is a flow diagram illustrating the operation of the exemplary video recorder according to an advantageous embodiment of the present invention.

This process may be more clearly understood with reference to FIG. 4. FIG. 4 depicts flow diagram 400 illustrating the operation of exemplary video recorder 150 according to an advantageous embodiment of the present invention. The process steps set forth in flow diagram 400 are executed in VR controller 250. VR controller 250 determines that video recorder 150 is receiving a video program and identifies the program (e.g., using EPG information) (process step 410). VR controller 250 then determines whether the video program is one that has been selected to be recorded (decision step 415). If the video program has not been selected to be recorded, control then goes to process step 420. VR controller 250 then causes video recorder 150 to wait for a new video program to begin (process step 420). When a new video program begins, control returns to process step 410.

If VR controller 250 determines in decision step 415 that the video program is one that has been selected to be recorded, VR controller 250 then causes hard disk drive 230 to start recording the video program (process step 425). As the video program is being recorded, VR controller 250 and computer software 300 assemble a transcript of the video program excluding commercials (process step 430). After a portion of the transcript has been assembled for a preselected period of time, VR controller 250 uses transcript comparison application 360 of computer software 300 to determine whether the assembled transcript matches a transcript that has previously been stored in the transcript database (decision step 435).

If the assembled transcript matches a transcript that has previously been stored in the transcript database, then the video program has already been recorded and hard disk drive 230 is recording the video program a second time. VR controller 250 then stops the second recording of the video program on hard disk drive 230 (process step 440). VR controller 250 then resets video recorder 150 by causing hard disk drive 230 to discard that portion of the video program that was recorded a second time (process step 445). VR controller then discards the corresponding transcript from the transcript database (process step 450). VR controller 250 then causes video recorder 150 to wait for a new video program to begin (process step 420). When a new video program begins, control returns to process step 410.

If the assembled transcript does not match a transcript that has previously been stored in the transcript database, then the video program has not been recorded and hard disk drive 230 is recording the video program for the first time. The recording of the video program continues. The process of assembling a transcript also continues until the video program ends (process step 450). When the video program ends, VR controller 250 stops the recording of the video program on hard disk drive 230 (process step 455). VR controller 250 then adds the transcript of the newly recorded video program to the transcript database (process step 460). VR controller 250 then causes video recorder 150 to wait for a new video program to begin (process step 420). When a new video program begins, control returns to process step 410.

Although the present invention has been described in detail, those skilled in the art should understand that they can make various changes, substitutions and alterations herein without departing from the spirit and scope of the invention in its broadest form.

What is claimed is:

1. A system for determining whether an incoming video program has previously been recorded by a video recorder, said system comprising:

means for obtaining at least a portion of a transcript of said incoming video program;

means for obtaining at least a portion of a transcript of each of the video programs previously recorded by said video recorder;

means for comparing said portion of said transcript of said incoming video program with the portions of the transcripts of video programs that have previously been recorded by said video recorder; and means for determining, in response to said comparison, whether said incoming video program has previously been recorded, wherein said system further comprises:

means for aborting a process of recording said incoming video program by said video recorder when said determining means determines that said incoming video program has previously been recorded by said video recorder; and means for discarding a transcript of an incoming video program for which the process of recording has been aborted.

2. A video recorder capable of determining whether an incoming video program has previously been recorded by said video recorder, said video recorder comprising:

means for obtaining at least a portion of a transcript of said incoming video program;

means for obtaining at least a portion of a transcript of each of the video programs previously recorded by said video recorder;

means for comparing said portion of said transcript of said incoming video program with the portions of the transcripts of the video programs that have previously been recorded by said video recorder; and means for determining, in response to said comparison, whether said incoming video program has previously been recorded, wherein said video recorder further comprises:

means for aborting a process of recording said incoming video program when said determining means determines that said incoming video program has previously been recorded by said video recorder; and means for dicarding a transcript of an incoming video program for which the process of recording has been aborted.

3. A method for determining whether an incoming video program has previously been recorded by a video recorder, said method comprising the steps of:

obtaining at least a portion of a transcript of said incoming video program;

obtaining at least a corresponding portion of a transcript of each of the video programs previously recorded by said video recorder;

comparing said portion of said transcript of said incoming video program with the transcripts of video programs that have previously been recorded by said video recorder; and determining, from said comparison, whether said incoming video program has previously been recorded, wherein the method further comprises the steps of:

aborting the process of recording said incoming video program when it is determined that said incoming video program has previously been recorded by said video recorder; and discarding a transcript of an incoming video program for which the process of recording has been aborted.

4. Computer-executable instructions stored on a computer-readable storage medium for determining whether an incoming video program has previously been recorded by a video recorder, the computer-executable instructions comprising the steps of:

obtaining at least a portion of a transcript of said incoming video program;

obtaining at least a portion of a transcript of each of said video programs previously recorded by said video recorder;

comparing said portion of said transcript of said incoming video program with said portions of the transcripts of the video programs that have previously been recorded by said video recorder; and determining, from said comparison, whether said incoming video program has previously been recorded, wherein said computer-executable instructions further comprise the steps of:

aborting the process of recording said incoming video program when it is determined that said incoming video program has previously been recorded by said video recorder; and discarding a transcript of an incoming video program for which the process of recording has been aborted.

\* \* \* \* \*